United States Patent [19]

Perkins

[11] 3,952,190
[45] Apr. 20, 1976

[54] UNDERWATER STROBE FLASH UNIT
[76] Inventor: Ronald L. Perkins, 10911 Monteverde Lane, Houston, Tex. 77072
[22] Filed: Nov. 8, 1974
[21] Appl. No.: 522,149

[52] U.S. Cl. ............................ 240/26; 240/1.3; 354/145
[51] Int. Cl.² ................ G03B 17/08; G03B 15/05; F21V 31/00
[58] Field of Search ............. 240/26, 20, 1.3, 7.5, 240/2 C; 354/64, 145

[56] References Cited
UNITED STATES PATENTS

| 2,872,622 | 2/1959 | Edgerton | 354/145 X |
| 2,996,966 | 8/1961 | Edgerton | 354/173 |
| 3,252,393 | 5/1966 | Stellrecht et al. | 354/140 |
| 3,596,237 | 7/1971 | Barber et al. | 240/51.11 X |
| 3,737,651 | 6/1973 | Shute | 240/51.11 R |
| 3,786,734 | 1/1974 | Long et al. | 354/145 X |

FOREIGN PATENTS OR APPLICATIONS

| 25,955 | 9/1967 | Japan | 240/1.3 |
| 1,078,874 | 11/1954 | France | 354/64 |

Primary Examiner—Robert P. Greiner

[57] ABSTRACT

A method of waterproofing a strobe flash unit for use in underwater photography. A mold is formed and a strobe flash unit is mounted within the mold. Epoxy resin is poured into the mold to surround the strobe flash unit with the resin. The resin is then cured until it hardens, at which time the mold is removed from the epoxy resin and strobe flash unit. The resultant product is a strobe flash unit encapsulated in a transparent waterproof casing.

11 Claims, 6 Drawing Figures

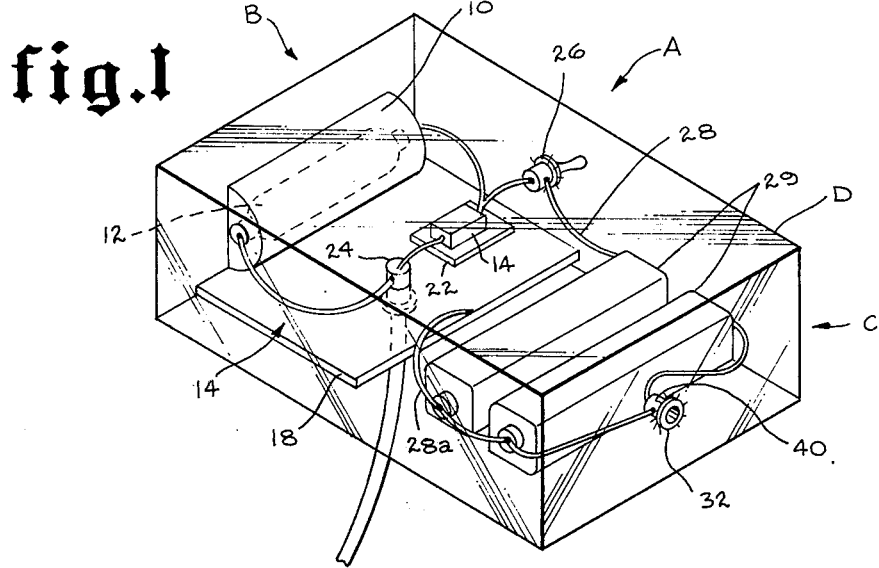
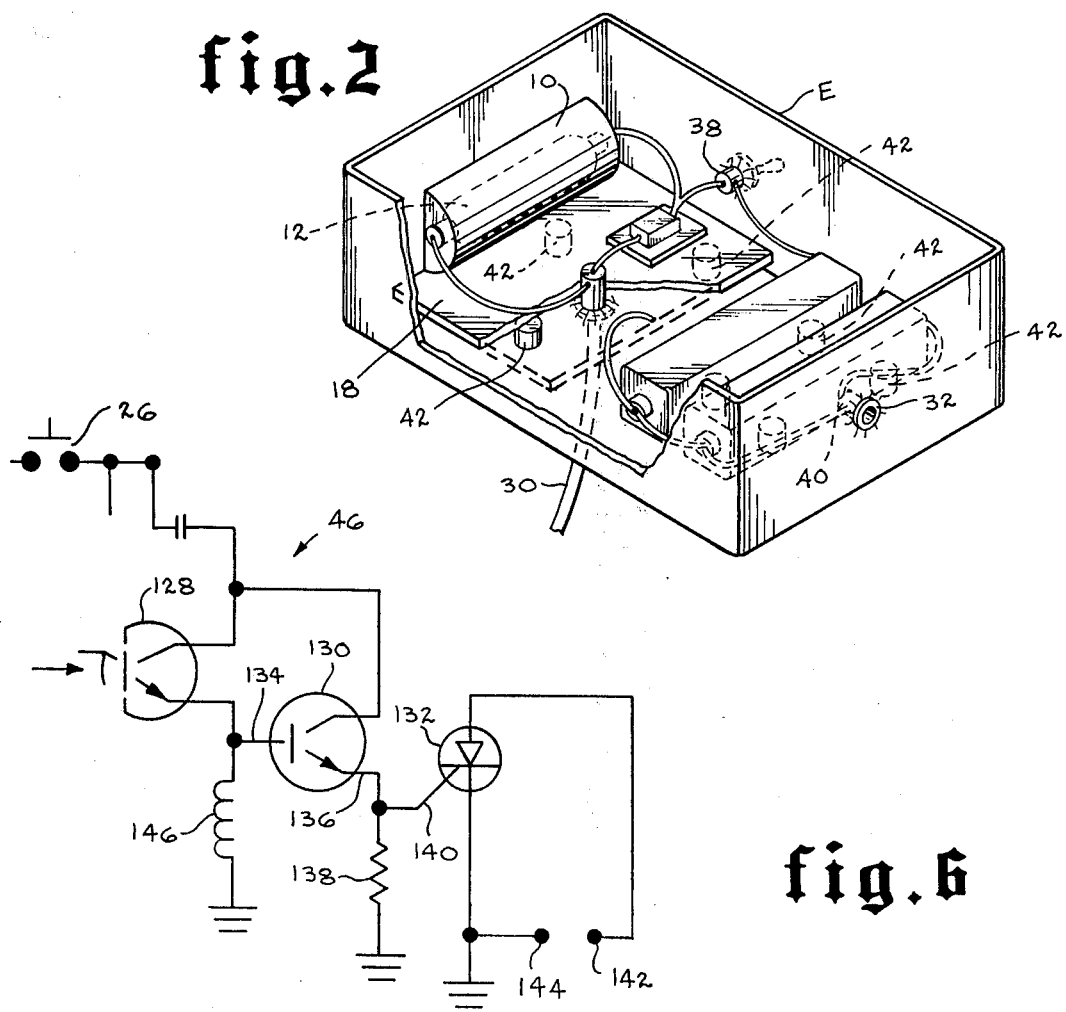

3,952,190

UNDERWATER STROBE FLASH UNIT

BACKGROUND OF THE INVENTION

This invention relates generally to photographic equipment for underwater use and more particularly to light sources used in underwater photography and the methods of making such light sources.

An apparatus for providing adequate lighting is vital to underwater photography. Strobe flash units adapted for underwater use must be waterproof and capable of withstanding the intense stresses encountered in deep water. Yet, they should also be as light-weight and compact as possible to permit easy handling. Further, the flash units should dissipate heat as rapidly as possible to prolong the operating life of the unit.

In the past, a few underwater flash units, such as those described in U.S. Pat. Nos. 2,996,966 and 3,252,393, have been available. However, they were relatively expensive and difficult to handle because of their substantial bulk. Another problem encountered with some known underwater flash units stemmed from the fact that air pockets were present between the flash unit and the casing. In some cases, there were even air pockets within the casing material. As the devices containing these air pockets were lowered to substantial depths in the water, structural failures frequently occurred due to the difference in the hydrostatic pressure and the pressure exerted by these air pockets. These structural failures would, of course, render the flash unit inoperative. In addition, the air pockets formed insulating layers which inhibited the dissipation of heat generated by the flash unit. As a consequence, the operating life of the underwater flash unit was substantially lessened.

SUMMARY OF THE INVENTION

It is an object of this invention to provide a new and improved underwater strobe flash unit and a method for making such a flash unit. An elastomer mold is formed, and a strobe flash unit including a portable power supply is mounted in the mold. Apertures may be formed in a surface of the mold to receive external actuating mechanisms such as a synchronizing cable or power switch. After the external actuating mechanisms are connected to the flash unit, epoxy resin is poured into the mold. The epoxy resin surrounds the strobe flash unit and power supply and replaces the air between the flash unit and the mold. The epoxy resin is then cured until it is hard, at which time the mold is removed.

The resulting product is a strobe flash unit and power supply encapsulated in a waterproof casing of transparent epoxy resin. Although the casing may be thin, the strength of epoxy resin and the absence of any air pockets within the resin enables the casing to withstand the intense hydrostatic pressures encountered in deep water. The absence of air pockets within the epoxy resin also permits rapid dissipation of the heat generated by the flash unit. Further, the casing is lightweight and only slightly larger than the flash unit and power supply so that the resultant product is very lightweight and easy to handle.

BRIEF DESCRIPTION OF THE DRAWINGS

FIG. 1 is a perspective view of one embodiment of a resultant underwater strobe flash unit;

FIG. 2 is a perspective view showing a flash unit and a power supply mounted in a mold;

FIG. 6 is a schematic representation of the slave actuating mechanism.

DETAILED DESCRIPTION OF THE PREFERRED EMBODIMENTS

Figure 4:
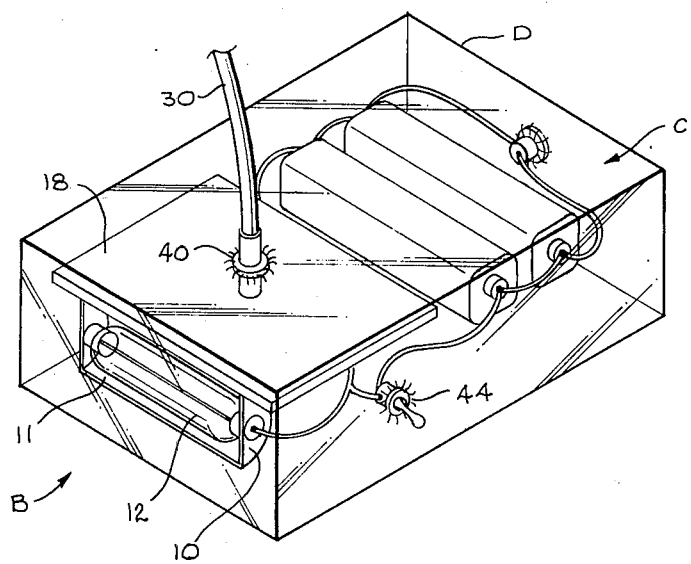
FIG. 4 illustrates a method of sealing external actuating mechanisms in epoxy resins.

In the drawings, the letter A designates generally a strobe flash unit B and power supply C encapsulated in epoxy resin D. The strobe flash unit B and power supply C are mounted in a mold E. Fluid epoxy resin is then poured into the mold where it surrounds and covers the flash unit B in the power supply C. The epoxy resin is then cured until it hardens, at which time the mold E is removed leaving the encapsulated flash unit and power supply A.

Considering the invention in more detail, the strobe flash unit B consists of a light directing member 10, a lamp 12, and an energizing circuit 14. As shown in FIG. 2, the light directing member may be a hollow, semicylindrical body having a reflective inner surface 11. Lamp 12 is positioned within the light emitted from the front of lamp 12 travels directly to the object to be illuminated and a substantial part of the remainder of the light emitted from lamp 12 is reflected by inner surface 11 to the illuminated object. Both light directing member 10 and lamp 12 mounted in a convenient manner on an electrically conductive plate or printed circuit board 18 which forms a part of energizing circuit 14.

A power supply C is electrically connected to printed circuit board 18 to supply a source of voltage for energizing circuit 14. The power supply may consist of a pair of series connected cadmium nickel batteries 29 as shown in FIG. 1, although any suitable portable source of direct current energy mayy be used. Voltage from power supply C is amplified by energizing circuit 14 and used to energize the lamp 12. A power switch 26 is provided in circuit 14 to disconnect power supply C when the flash unit B is not in use so that the power supply C will not be dissipated unnecessarily. A synchronizing circuit 24 is connected to a camera and actuated by synchronizing cable 30 as shown in FIG. 2. The synchronizing switch 24 synchronizes the actuation of energizing circuit 14 so that lamp 12 will be energized at the precise moment the picture is taken.

Figure 3:
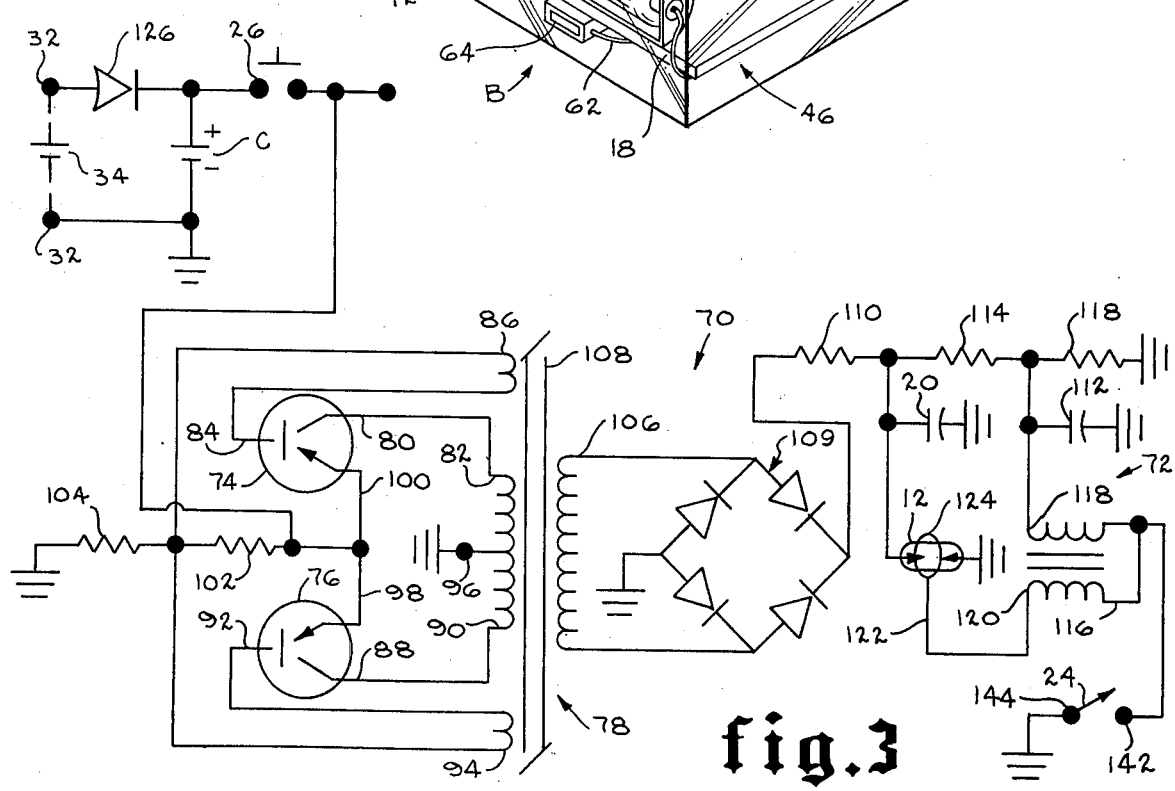
FIG. 3 is a schematic illustration of the energizing circuit according to one embodiment of the present invention.

FIG. 3 is a schematic representation of the power supply C and energizing circuit 14. Energizing circuit 14 consists of an amplifying circuit 70 and a triggering circuit 72. Amplifying circuit 70 includes two transistors 74 and 76 electrically connected to the primary side of a transformer 78. A collector 80 of transistor 74 is connected to a first primary winding 82 of transformer 78, and a base 84 of transistor 78 is connected to a second primary winding 86 of transformer 78. Similarly, a collector 88 of transistor 76 is connected to a third primary winding 90 of transformer 78, and a base 92 of transistor 76 is connected to a fourth primary winding 94 of transformer 78. Primary windings 82 and 90 of transformer 78 have a common electrical ground at a terminal 96. As can be seen from FIG. 3, an emitter 98 of transistor 76 and an emitter 100 of transistor 74 are both electrically connected to a resistor 102 which, in turn, is electrically connected to ground through a resistor 104. Primary windings 86 and 94 of transformer 78 are electrically connected between resistors 102 and 104 to provide a completed circuit for those primary windings.

When power switch 26 is closed, voltage from power supply C will be provided to emitters 100 and 98 of transistors 74 and 76 for amplification by the amplifying circuit 70. Transistors 74 and 76 alternately conduct current through the primary windings of transformer 78 to induce a voltage in the secondary winding 106 of transformer 78. The alternating conduction of transistor 74 and 76 is controlled by the saturation of a core 108 of transformer 78, which couples each of the primary windings and the secondary winding of the transformer 78. For example, when transistor 74 conducts, a current will flow through primary winding 82 of transformer 78. This conduction will induce a voltage in primary winding 86 to insure that the emitter 100 of transistor 74 is positive with respect to its base 84 so that it will continue to conduct. At the same time, the current flowing through the primary winding 82 will also induce a voltage in primary windings 90 and 94. However, due to the connections of these windings, the voltage induced in these primary windings will insure that the emitter 98 of transistor 76 is negative with respect to its base 92 so that transistor 76 will not conduct at the same time transistor 74 conducts. This operation of circuit 70 continues until core 108 of transformer 78 saturates. Upon saturation of core 108, the reactance of each primary winding goes to zero and transformer 74 stops conducting. The magnetic flux in core 108 falls and thereby induces a voltage across each of the primary windings which is opposite in polarity to the voltage induced when transformer 74 is conducting. This voltage of opposite polarity causes transistor 76 to start conducting because the emitter 98 of transistor 76 is then positive with respect to its base 92.

A continued alternating conduction of transistors 74 and 76 continues due to the periodic saturation of magnetic core 108. This alternating conduction of the two transistors causes an amplified alternating current to be induced in secondary winding 106 of transformer 78. Thus, the voltage from power supply C is converted to an amplified voltage signal with alternating polarity. A conventional rectifying bridge 109 is used to rectify the signal and transmit it through a resistor 110 to storage capacitor 20 which is electrically connected in parallel across lamp 12.

The output signal of rectifying bridge 109 is also provided to the triggering circuit 72 through resistor 114. Triggering circuit 72 consists of a storage capacitor 112 connected to a primary winding of step up transformer 116 and connected in parallel with grounded resistor 118. Both the primary and the secondary windings of step up transformer 116 are connected to a synchronizing switch 124.

The triggering circuit 72 is provided with the present invention to allow the charge stored on capacitor 20 to energize lamp 12. Normally, the charge on capacitor 20 is insufficient to overcome the resistance of the gases between the electrodes of lamp 12. Accordingly, trigering circuit 72 is provided to ionize the gases in lamp 12 so that capacitor 20 will discharge into lamp 12 and energize the lamp at the precise instant a picture is being taken. When synchronizing switch 24 is closed, primary winding 118 of step up transformer 26 is shorted directly to ground. Capacitor 112 therefore discharges very rapidly through the primary winding 118 and induces an extremely high voltage in a secondary winding 120 of transformer 116. The extremely large voltage induced in the secondary winding 120 is transmitted by a conductor 122 to a loop 124 around lamp 12. The large momentary voltage in loop 124 partially ionizes the gases in lamp 12 to a sufficient level to permit capacitor 20 to discharge through the lamp and energize it.

Amplifying circuit 70 and trigering circuit 72 are conventional for use with a strobe unit. It should be understood that other circuits may be used with the present invention without departing from the spirit of the invention.

However, the circuit shown in FIG. 2 also includes a novel external charging ciruit for power supply C. A supplementary power supply 34 may be connected between terminals 32 to recharge power supply C in a conventional manner. A diode 126 is provided to insure unidirectional flow of the charging voltage from supplementary power supply 34 to power supply C. Diode 126 also prevents discharge of power supply C when the flash strobe unit of the present invention is being used underwater and supplementary power supply 34 is not connected between terminals 32. When the strobe flash unit is used in salt water, that salt water will normally conduct a voltage between the terminals 32. However, by providing diode 126, discharge of power supply C through the salt water is prohibited.

An initial step in the method of making the encapsulated flash unit and power supply A is forming a mold E such as that shown in FIG. 2. The shape of the mold E conforms generally to the shape of the flash unit B and the power supply C, but it has a slightly larger interior volume so that the flash unit B and power supply C may be readily placed within the mold E. The mold E is made of urethane or other materials which are suitable for forming small molds. The urethane mold E may be formed in any conventional manner such as by a vacuum process. Further, it is preferred that the mold E be made of an elastomer.

The mold E may be formed with one or more apertures to receive portions of external actuating mechanisms which may be attached to the encapsulated flash unit and power supply A. For example, aperture 36 shown in FIG. 2 is formed in the base of the mold E so that synchronizing cable 30 may be extended through the bottom of the mold E and attached to synchronizing switch 24. The aperture 36 is slightly smaller in diameter than synchronizing cable 30. However, because the mold E is made of an elastomer the cable 30 can still be extended through the aperture 36. The lips of the aperture 36 will tend to constrict about the cable 30 and form a seal around cable 30 so that when fluid epoxy resin is poured into the mold E, the resin is retained in the mold. Similarly, apertures may be formed in mold E to receive the base 38 of power switch 26 and the base 40 of recharging connector 32.

Once the mold has been formed, support members 42 are placed in a spaced relation to each other so that they will support the flash unit B and the power supply C. The support members 42 are preferably formed of cured epoxy resin. Each of the support members 42 has flat upper and lower surfaces so that they will be relatively stable when placed on the bottom of mold E.

Once the support members 42 are mounted in the mold E, flash unit B and power supply C are mounted on the support members 42. The external actuating mechanisms, such as synchronizing cable 30, are then extended through the apertures in the mold E and attached to the flash unit B and power supply C. Any additional electrical connection which needs to be made between the power supply C and the flash unit B is also made at this time.

Next, the fluid epoxy resin is poured into the mold E. Enough resin is poured into the mold E so that the flash unit B and power supply C will be fully covered with the resin. The resin also flows beneath the flash unit B and power supply C since the support members 42 elevate the flash unit and power supply from the bottom of the mold E. Thus, the flash unit and power supply will be completely surrounded by the fluid epoxy resin.

Once a sufficient amount of epoxy resin has been poured into the mold E, the resin is allowed to cure until it hardens. Once it has become rigid, the epoxy resin forms a thin transparent waterproof casing surrounding the flash unit B and power supply C. Further, portions of the external actuating mechanism, such as part of cable 30 and the bases 38 and 40 of power switch 26 and recharging connector 32, are embedded in the rigid epoxy resin. Once the resin has hardened, the mold E is removed from the encapsulated unit A. Since the mold E is made of an elastomer, it may be stretched when it is disengaged from unit A so that the external actuating mechanisms are not damaged.

Once the mold E has been removed, it is desirable to further seal the external actuating mechanisms in the epoxy resin. As shown in FIG. 4, indentions 44 in the cured epoxy resin D are present due to the constriction of the elastomer mold E around each of the actuating mechanisms. These indentions 44 are filled with a sealing compound. RTV SEALASTIC, a rubber agent manufactured by Dow Corning, is suitable for this purpose. However, other sealing agents may be used.

It should be understood, of course, that the abovedescribed method of making an underwater strobe flash unit may be modified by encapsulating the flash unit B and the power supply C separately. Individual molds conforming to the size and shape of the respective elements to be encapsulated are formed, and the elements are encased in epoxy resin in the manner described above. Once the epoxy resin has cured, the encapsulated flash unit B and the encapsulated power supply C are electrically connected. Then the two units are cemented together or mounted with each other in any suitable manner.

Figure 5:
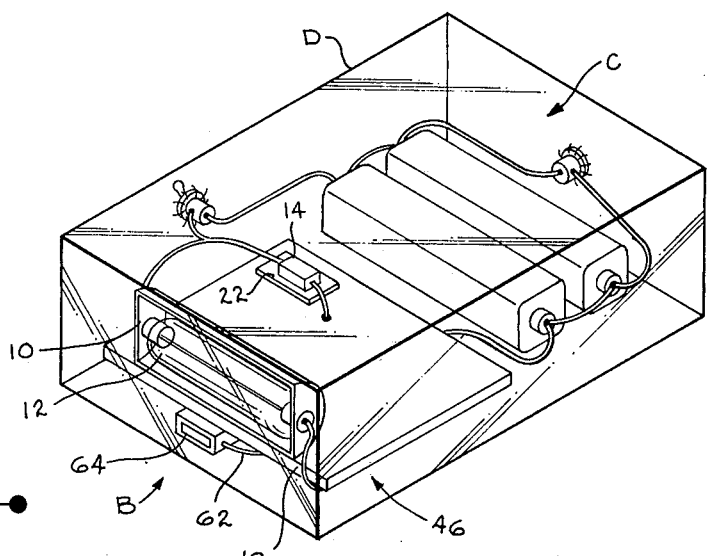
FIG. 5 is a perspective view of an embodiment of a resultant strobe flash unit incorporating a slave actuating means.

FIG. 5 illustrates an additional embodiment of the present invention which incorporates a light actuated synchronizing assembly 46. This light actuated synchronizing assembly 46 replaces the synchronizing switch 24 and synchronizing cable 30 of the embodiment shown in FIG. 1. FIG. 6 is a schematic representation of the light actuated synchronizing assembly 46. The assembly 46 includes a photo sensitive semi-conductor such as photocell 128, and amplifying transistor 130, and a silicon-controlled rectifier (SCR) 132. When photocell 128 detects light, it conducts and provides an input to a base 134 of amplifying transistor 130. Transistor 130 then amplifies the signal received at its base 134 and generates an amplified signal at an emitter 136 of transistor 130. Emitter 136 is electrically connected to the ground through a large resistor 138 and to a gate 140 of SCR 132. SCR 132 normally will not conduct electricity between its terminals 142 and 144. However, when an output signal from amplifying transistor 130 is received at gate 140, due to the sensing of light by photocell 128, SCR 132 forms an electrical short between terminals 142 and 144.

When the light actuated synchronizing assembly 46 is used with the present invention, SCR 132 is placed between terminals 142 and 144 shown in FIG. 2 in lieu of synchronizing switch 24. In this manner, the trigering circuit 72 is actuated and lamp 12 is energized when photocell 128 detects light. However, trigering circuit 72 will not be actuated by assembly 46 merely by the detection of small changes in the ambient light. An inductor 146 is provided at the base 134 of amplifying transistor 130 so that small voltages produced by photocell 128 due to small changes in the ambient light will not cause amplifying transistor 130 to conduct and supply an amplified signal to the gate 140 of SCR 132. For a small voltage produced by photocell 128, inductor 146 will appear as an electrical short to transmit the small voltages from photocell 128 to ground. However, when photocell 128 detects large changes in the light intensity surrounding the strobe unit, it will produce a large, rapidly increasing voltage at the base of 134. For these rapidly increasing voltages, inductor 146 will not act as a short, but will offer a large reactance causing most of the output from photocell 128 to flow to the base 134 of amplifying transistor 130. This will cause the amplifying transistor 130 to conduct and provide an actuating signal to the gate 140 of SCR 132. As shown in FIG. 5, assembly 46 is preferably encapsulated in epoxy resin in the same manner that flash unit B empowers supply C are encapsulated in the epoxy resin D which forms the casing for the flash unit and power supply C.

An advantage of having the light actuated synchronizing assembly 46 incorporated in flash unit A is that the unit A becomes capable of slave operation. A light source which is not connected to the slave unit shown in FIG. 5 may be used to actuate the slave unit. For example, to provide adequate elimination in a rather large area, a number of slave units may be positioned throughout the area. A single flash unit directly connected to and synchronized with an underwater camera may then be used to actuate each of the slave units at substantially the same time. As soon as the flash unit directly connected to the camera is energized and transmits light to photocell 128 of the slave units, SCR 132 will conduct and lamp 12 will also be energized. Thus, the embodiment of the present invention shown in FIG. 1 may be used with any number of slave units shown in FIG. 5 to provide area illumination in underwater photography.

The resultant product of each of the embodiments of the present invention is a compact reliable strobe flash unit for use in underwater photography. The layer of epoxy resin D which surrounds the flash unit B and power supply C is sufficiently strong to withstand the intense stresses encountered in deep waters. The elimination of air pockets between the elements encapsulated and the casing material substantially reduces the internal stress placed on the encapsulating material and permits rapid dissipation of the heat generated by flash unit B so that the operating life of the flash unit B is extended. With the addition of recharging connectors 32, the operating life of the flash unit and power supply is also extended because the power supply C can be easily recharged despite the fact that the power unit is encapsulated. Further, the uncomplicated method by which the units A are made permits economical production of the units.

The above description of the present invention discloses a method of encapsulating a strobe flash unit in a waterproof casing. It would be understood, however, that other articles may be similarly encapsulated. Further, the above description discloses epoxy resin as the encapsulating material, but any substantially clear castable resin which is curable to a solid state at a temperature compatible with the article to be encapsulated may be used.

The foregoing disclosure and description of the invention are illustrative and explanatory thereof, and various changes in the size, shape, and materials as well as in the details of the illustrated construction may be made without departing from the spirit of the invention.

I claim:

1. A method of waterproofing a strobe flash unit including a synchronizing switch actuated by cable means and power supply for use in underwater photography, comprising:

providing an elastomer mold;
mounting a strobe flash unit and power supply within said mold;
forming an aperture through one surface of said mold;
extending a cable slightly larger than said aperture through said aperture to said strobe flash unit;
attaching said cable to said synchronizing switch to operatively connect said cable and said switch;
electrically connecting said strobe flash unit, said switch and said power supply;
pouring epoxy resin into said mold to surround said strobe flash unit and power supply;
curing said epoxy resin in said mold;
removing said mold from said epoxy resin, whereby said strobe flash unit and power supply are encapsulated in a waterproof casing of epoxy resin.

2. The method set forth in claim 1, wherein the step of mounting said strobe flash unit and said power supply within said mold includes:

placing a plurality of support members at spaced points on the bottom of said mold; and
mounting said strobe flash unit and said power supply on said support members, whereby said strobe flash unit and said power supply are spaced from the bottom of said mold so that said epoxy resin flows beneath said strobe flash unit and said power supply as said epoxy resin is poured into said mold.

3. The method as set forth in claim 1, further including:

providing a plurality of epoxy resin support members for supporting the flash unit elements in the mold.

4. The method set forth in claim 1, further including:

sealing said cable in said epoxy resin after removing said mold.

5. A method of waterproofing a strobe flash unit including a power switch having a base and an actuating mechanism to connect said strobe flash unit to a power source for use in underwater photography, comprising:

providing an elastomer mold;
mounting a strobe flash unit, power switch, and power source within said mold;
forming an aperture in one surface of said mold;
extending the base of the power switch through said aperture into said mold;
electrically connecting said power switch to said strobe flash unit and said power supply;
pouring epoxy resin into said mold to surround said strobe flash unit, power switch, and power source;
curing said epoxy resin in said mold;
removing said mold from said epoxy resin, whereby said strobe flash unit, power switch, and power source are encapsulated in a waterproof casing of epoxy resin.

6. The method set forth in claim 5, further including:

sealing said power switch in said epoxy resin after removing said mold.

7. A method of waterproofing a strobe flash unit including a light actuated synchronizing assembly contained in a housing and power supply for use in underwater photography, comprising:

providing an elastomer mold;
mounting a strobe flash unit and power supply within said mold;
electrically connecting said synchronizing assembly with said strobe flash unit;
electrically connecting said strobe flash unit and said power supply;
mounting said synchronizing assembly within said mold;
pouring epoxy resin into said mold to surround said strobe flash unit and power supply;
curing said epoxy resin in said mold;
removing said mold from epoxy resin, whereby said strobe flash unit and power supply is encapsulated in a waterproof casing of epoxy resin.

8. A strobe flash unit and power supply adapted for use in underwater photography, comprising:

means for emitting light including:
a lamp;
energizing means electrically connected to a power supply for energizing said lamp;
a power switch for connecting and disconnecting said power supply from said energizing means;
said lamp, energizing means, power supply, and power switch constituting a means for emitting light; and
water tight casing means enclosing said means for emitting light for preventing water from contacting said means for emitting light, said casing means encapsulating said means for emitting light.

9. The structure set forth in claim 8, wherein:
said watertight casing means is epoxy resin.

10. The structure set forth in claim 8, wherein said energizing means includes:

a. a light sensitive means for producing a signal in response to light transmitted to the light sensitive means; and
b. a silicon controlled rectifier electrically connected to and actuated by said signal from said light sensitive means for energizing said lamp in response to the signal produced by said light sensitive means, whereby said lamp is energized when said power switch connects said energizing circuit to said power supply and light is transmitted to said light sensitive means.

11. A strobe flash unit and power supply adapted for use in underwater photography, comprising:

means for emitting light;

a power supply electrically connected to said means for emitting light;

water tight casing means enclosing said means for emitting light and said power supply for preventing water from contacting said means for emitting light and said power supply, said casing means encapsulating said means for emitting light and said power supply; and recharging connector means partially embedded in said casing means and electrically connected to said power supply for providing electrical connection for detachably engaging a supplementary energy source to said power supply for recharging said power supply.

* * * * *